United States Patent
Warren et al.

(10) Patent No.: US 9,319,815 B2
(45) Date of Patent: Apr. 19, 2016

(54) MANAGING AUDIO OUTPUT THROUGH AN INTERMEDIARY

(75) Inventors: Jeremy Bruce Warren, Draper, UT (US); Jeffrey Glenn Thomas, Draper, UT (US)

(73) Assignee: Vivint, Inc., Provo, UT (US)

( * ) Notice: Subject to any disclaimer, the term of this patent is extended or adjusted under 35 U.S.C. 154(b) by 972 days.

(21) Appl. No.: 13/183,349

(22) Filed: Jul. 14, 2011

(65) Prior Publication Data

US 2013/0016848 A1    Jan. 17, 2013

(51) Int. Cl.
*H04B 3/00* (2006.01)
*H04R 27/00* (2006.01)

(52) U.S. Cl.
CPC .................................. *H04R 27/00* (2013.01)

(58) Field of Classification Search
CPC ...... H04R 27/00; H04R 2420/07; H04R 5/04; H04R 2227/003; H04R 2227/005; H04R 2420/03; H04R 2430/01; H04R 25/554; G08B 25/14; G08B 25/008; G08B 25/004; G08B 25/001; G08B 29/08; G08B 25/08; G08B 13/196; G08B 13/19656; G08B 13/19669; G08B 13/19673; H04B 3/00
USPC .................... 381/1–3, 56–59, 61, 77; 700/94; 340/359.1, 540–542, 545.1, 531; 369/2
See application file for complete search history.

(56) References Cited

U.S. PATENT DOCUMENTS

| | | | |
|---|---|---|---|
| 5,293,358 A * | 3/1994 | Krause | 369/2 |
| 5,771,296 A | 6/1998 | Unemura | |
| 7,015,806 B2 * | 3/2006 | Naidoo et al. | 340/531 |
| 2004/0234088 A1* | 11/2004 | McCarty et al. | 381/306 |
| 2010/0280637 A1* | 11/2010 | Cohn et al. | 700/90 |

* cited by examiner

*Primary Examiner* — Lun-See Lao
(74) *Attorney, Agent, or Firm* — Holland & Hart LLP (57) ABSTRACT

The present invention extends to methods, systems, and computer program products for managing audio output through an intermediary. In some embodiments, an audio controller emulates a direct connection between an audio source device and an audio output device. In other embodiments, audio content local to an audio controller is combined with other audio content passing through the audio controller on its way from an audio source device to an audio output device. In additional embodiments, an audio output device is locked to an audio controller. The lock survives power cycling and soft resets of the audio output device. A special hard reset can be used to release the audio output device.

7 Claims, 9 Drawing Sheets

MANAGING AUDIO OUTPUT THROUGH AN INTERMEDIARY

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, devices use wireless communication to establish networks. After a network is established, the devices can wirelessly exchange data over the network. For example, an MP3 player can use a wireless communication process to establish a connection to wireless speaker. After a connection is established, the MP3 player can stream music to the wireless speakers for output.

However, when secure communication over wireless networks is required it can be more difficult to correctly configure devices for connection to one another. Standards such as WiFi Protected Setup (WPS) exist to simplify the configuration process, but these don't address the issue of establishing pairings for streaming audio content, which must be done separately. In addition, while standards such as Universal Plug and Play (UPnP) exist for pairing devices for streaming audio content, these are generally implemented in support of uses cases that involve ad-hoc pairings of source devices to speakers, rather than consistent, dedicated connections between devices.

BRIEF SUMMARY

The present invention extends to methods, systems, and computer program products for managing audio output through an intermediary. In some embodiments, audio content is wirelessly transferred from a source device to an output device through an intermediate audio controller. The audio controller receives an audio content transfer request. The audio content transfer request requests the transfer of audio content from the source device to the audio controller. The audio controller emulates a direct connection between the source device and the output device to the source device.

Emulating a direct connection includes the audio controller using wireless communication to formulate end-to-end audio control characteristics and use these end-to-end audio control characteristics to manage audio control parameters with the source device. The end-to-end audio control characteristics reflect how the audio content is sent from the source device through the audio controller to the output device for audio output. The end-to-end audio control parameters are formulated by regulating the computation of first audio control parameters used to transfer the audio content from the source device to the audio controller and by regulating the computation of second audio control parameters used to transfer the audio content from the audio controller to the output device for audio output.

The audio controller receives a portion of the audio content from the source device. The portion of audio content is sent in accordance with the first audio control parameters. The audio controller then sends the portion of audio content on to the output device in accordance with the second audio control parameters. The audio controller ensures that the entire transfer process is in accordance with the end-to-end audio control characteristics, and that the first audio control parameters emulate the end-to-end audio control characteristics.

In other embodiments, an audio controller modifies audio content being transferred through the audio controller. The audio controller transfers the audio content from a source device to an output device for real-time output. The audio controller receives an indication of an occurrence of an external event from a sensor device included in one or more devices. The indication is received at a time when the audio controller is in the process of transferring the audio content to the output device.

In response to receiving the indication of the external event, the audio controller determines that additional audio content related to the external event is to be output at the audio output device. The audio controller modifies one or more of the audio content and the transfer timing of the audio content in order to accommodate the additional audio content. The audio controller combines the additional audio content with the audio content sent to the output device.

In further embodiments, an audio controller and an audio output device connect to one another. The audio controller receives a user selection of a user-interface control for pairing with one or more audio output devices. An audio output device sends a request for wireless communication configuration information to any accessible wireless access points. The audio controller receives the request for communication configuration information from the audio output device.

The audio controller provides communication configuration information to the audio output device. The audio output device receives communication configuration information. The communication configuration information is used to establish wireless communication with the audio controller. The audio output device sends an advertisement signal advertising availability of the audio output device to pair with audio source devices. The audio controller detects the advertisement signal from the audio output device. The audio controller sends a pairing request to the audio output device. The audio output device accepts the pairing request. The pairing request includes controller pairing information.

The audio controller sends a signal to the audio output device to prompt the audio output device to stop sending advertisement signals. The audio output device receives the signal from the audio controller. In response to receiving the signal, the audio output device locks the audio output device to the audio controller. Locking the audio output device to the audio controller includes storing the communication configuration information and controller pairing information in non-volatile storage.

Locking the audio output device to the audio controller also includes directing the audio output device to re-connect to the audio controller in response to a power cycle or soft reset of the audio output device. Directing the audio output device to re-connect to the audio controller includes the audio output device automatically re-establishing communication with the audio controller using the stored communication configuration information. The audio output device also re-advertises availability to pair with audio source devices. The audio output device accepts a pairing request from the audio controller based on the stored controller pairing information. The audio output device does not respond to pairing requests from other devices based on the stored controller pairing information.

Locking the audio output device to the audio controller also includes permitting the audio output device to connect to any wireless access point and to any audio source device in response to a hard reset of the audio output device. Permitting the audio output device to connect to any wireless access point includes removing the communication configuration information from non-volatile storage, and permitting the audio output device to connect to any audio storage device includes removing the controller pairing information from non-volatile storage. The audio output device sends a new request for communication configuration information to any accessible wireless access point.

In additional embodiments, an audio output device is restricted to connecting to a single device. The single device is both a wireless access point and an audio source device, such as, for example, an audio controller. After the audio output device receives communication configuration information from a wireless access point and sends a pairing advertisement signal, the audio output device accepts a pairing request from the same device from which it received communication configuration information. After a hard reset, the audio output device is once again permitted to connect to any single device that is both a wireless access point and an audio source device.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for managing audio output through an intermediary. In some embodiments, audio content is wirelessly transferred from a source device to an output device through an intermediate audio controller. The audio controller receives an audio content transfer request. The audio content transfer request requests the transfer of audio content from the source device to the audio controller. The audio controller emulates a direct connection between the source device and the output device to the source device.

Emulating a direct connection includes the audio controller using wireless communication to formulate end-to-end audio control characteristics and use these end-to-end audio control characteristics to manage audio control parameters with the source device. The end-to-end audio control characteristics reflect how the audio content is sent from the source device through the audio controller to the output device for audio output. The end-to-end audio control parameters are formulated by regulating the computation of first audio control parameters used to transfer the audio content from the source device to the audio controller and by regulating the computation of second audio control parameters used to transfer the audio content from the audio controller to the output device for audio output.

The audio controller receives a portion of the audio content from the source device. The portion of audio content is sent in accordance with the first audio control parameters. The audio controller then sends the portion of audio content on to the output device in accordance with the second audio control parameters. The audio controller ensures that the entire transfer process is in accordance with the end-to-end audio control characteristics, and that the first audio control parameters emulate the end-to-end audio control characteristics.

In other embodiments, an audio controller modifies audio content being transferred through the audio controller. The audio controller transfers the audio content from a source device to an output device for real-time output. The audio controller receives an indication of an occurrence of an external event from a sensor device included in one or more devices. The indication is received at a time when the audio controller is in the process of transferring the audio content to the output device.

In response to receiving the indication of the external event, the audio controller determines that additional audio content related to the external event is to be output at the audio output device. The audio controller modifies one or more of the audio content and the transfer timing of the audio content in order to accommodate the additional audio content. The audio controller combines the additional audio content with the audio content sent to the output device.

In further embodiments, an audio controller and an audio output device connect to one another. The audio controller receives a user selection of a user-interface control for pairing with one or more audio output devices. An audio output device sends a request for wireless communication configuration information to any accessible wireless access points. The audio controller receives the request for communication configuration information from the audio output device.

The audio controller provides communication configuration information to the audio output device. The audio output device receives communication configuration information. The communication configuration information is used to establish wireless communication with the audio controller.

The audio output device sends an advertisement signal advertising availability of the audio output device to pair with audio source devices. The audio controller detects the advertisement signal from the audio output device. The audio controller sends a pairing request to the audio output device. The audio output device accepts the pairing request. The pairing request includes controller pairing information.

The audio controller sends a signal to the audio output device to prompt the audio output device to stop sending advertisement signals. The audio output device receives the signal from the audio controller. In response to receiving the signal, the audio output device locks the audio output device to the audio controller. Locking the audio output device to the audio controller includes storing the communication configuration information and controller pairing information in non-volatile storage.

Locking the audio output device to the audio controller also includes directing the audio output device to re-connect to the audio controller in response to a power cycle or soft reset of the audio output device. Directing the audio output device to re-connect to the audio controller includes the audio output device automatically re-establishing communication with the audio controller using the stored communication configuration information. The audio output device also re-advertises availability to pair with audio source devices. The audio output device accepts a pairing request from the audio controller based on the stored controller pairing information. The audio output device does not respond to pairing requests from other devices based on the stored controller pairing information.

Locking the audio output device to the audio controller also includes permitting the audio output device to connect to any wireless access point and to any audio source device in response to a hard reset of the audio output device. Permitting the audio output device to connect to any wireless access point includes removing the communication configuration information from non-volatile storage, and permitting the audio output device to connect to any audio storage device includes removing the controller pairing information from non-volatile storage. The audio output device sends a new request for communication configuration information to any accessible wireless access point.

In additional embodiments, an audio output device is restricted to connecting to a single device. The single device is both a wireless access point and an audio source device, such as, for example, an audio controller. After the audio output device receives communication configuration information from a wireless access point and sends a pairing advertisement signal, the audio output device accepts a pairing request from the same device from which it received communication configuration information. After a hard reset, the audio output device is once again permitted to connect to any single device that is both a wireless access point and an audio source device.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics (e.g., audio output devices, such as, speakers and headphones), network PCs, minicomputers, mainframe computers, mobile telephones, PDAs, pagers, routers, switches, alarm system control panels, home automation control panels, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
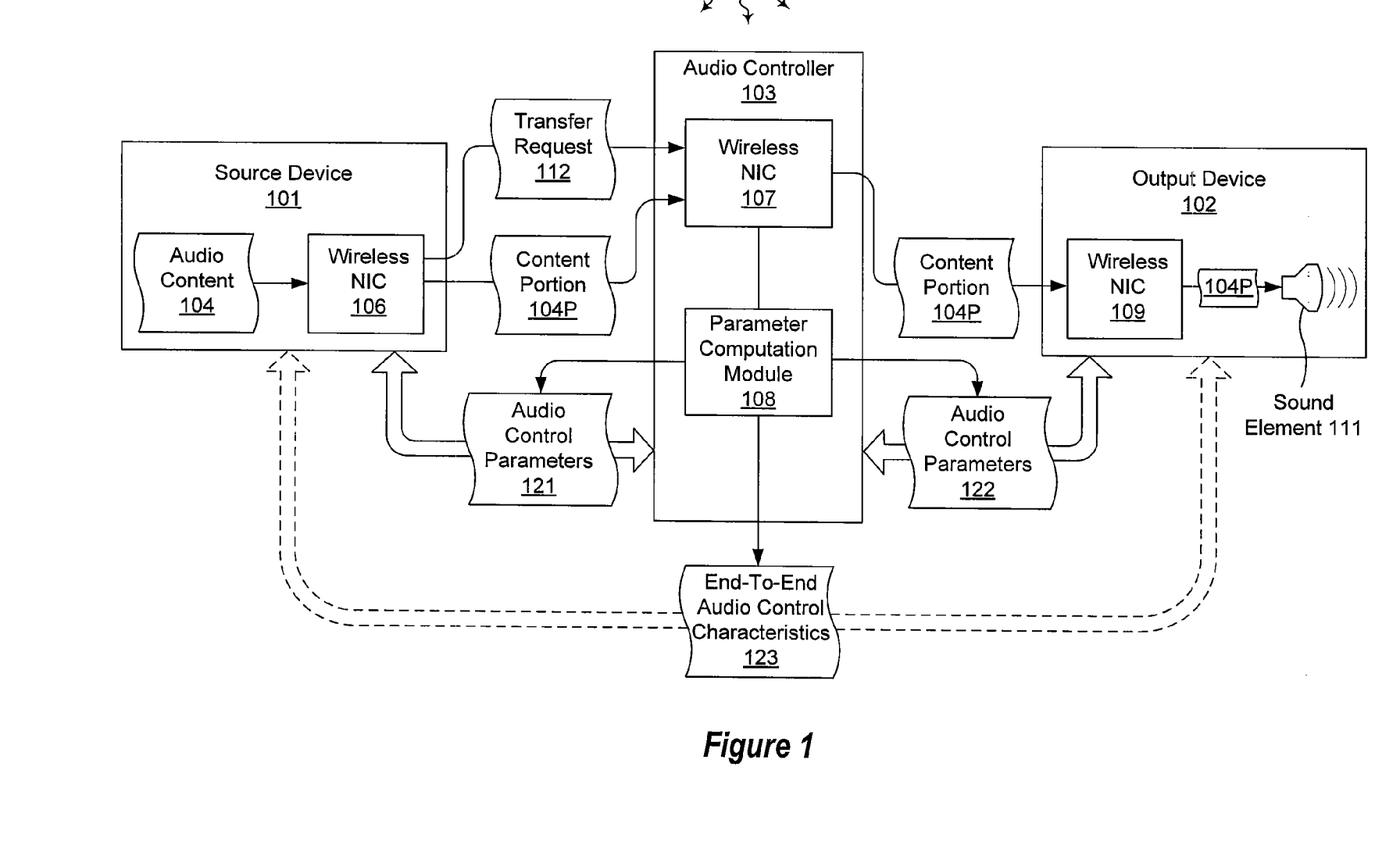
FIG. 1 illustrates an example computer architecture that facilitates wirelessly transferring audio content from a source device to an output device through an intermediary audio controller.

FIG. 1 illustrates an example computer architecture 100 that facilitates wirelessly transferring audio content from a source device to an output device through an intermediary audio controller. Referring to FIG. 1, computer architecture 100 includes source device 101, output device 102, and audio controller 103. Each of the depicted components is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data over the network. The message related data can be sent using any of a variety of communication protocols, including: Internet Protocol ("IP") and other higher layer protocols that utilize IP datagrams, such as, Transmission Control Protocol ("TCP") and User Datagram Protocol ("UDP"). The message related data can also be sent using even high layer protocols that utilize TCP segments or UDP datagrams, including Hypertext Transfer Protocol ("HTTP"), Real-time Transport Protocol ("RTP"), Real Time Streaming Protocol ("RTSP"), AirPlay (which uses UDP for streaming and is based on RTSP), Digital Audio Access Protocol ("DAAP"), other protocols used by Digital Living Network Alliance ("DLNA") compliant devices, etc.

As depicted, source device 101 includes audio content 104 and wireless NIC 106. Source device 101 can be a self contained device, such as, for example, a mobile audio playback device (e.g., an MP3 player) or mobile phone with audio play back capabilities (e.g., an iPhone or Droid). Alternately, source device 101 can be a computer system (e.g., a media server) including other internal and/or external components. Audio content 104 (e.g., digital data representing speech, music, etc.) can be stored at the computer system, such, as for example, on a hard disk, solid state driver, or other non-volatile memory. In other embodiments, audio content 104 is stored at a location on a WAN, such as, for example, on the Internet.

Audio content 104 can be stored in any of a variety of file formats, including uncompressed formats (e.g., WAV, AIFF, etc.) formats with lossless compression (e.g., m4a, MPEG-4, WMA, etc.), and formats with lossy compression (e.g., MP3). Generally, in response to a command entered at source device 101 or in response to a command received from another computer system, wireless NIC 106 can be used to send audio content 104 (e.g., stream, download, copy, etc.) to an audio output device (e.g., speakers). Wireless NIC 106 can encode and transfer portions of audio content in accordance with audio control parameters established between source device 101 and an audio output device.

As depicted, audio controller 103 includes wireless NIC 107 and parameter computation module 108. Audio controller 103 can be a computer system. In some embodiments, audio control 103 is also a control panel for some other type of system, such as, for example, an alarm system or home automation system.

Parameter computation module 108 can compute audio control parameters (e.g., buffer timings) for transferring audio content to and/or from other devices. In some embodiments, parameter computation module 108 accesses pre-assigned characteristics for other devices and uses the pre-assigned characteristics to compute audio control parameters. Alternately or in combination, parameter computation module 108 independently derives characteristics for other devices and uses the derived characteristics to computer audio control parameters. Parameter computation module 108 can instruct wireless NIC 107 to exchange messages with other devices and send results of the message exchanges back to parameter computation module 108.

Parameter computation module 108 can also compute end-to-end audio control characteristics for transferring audio content from an audio source device through audio controller 103 to an audio output device. Audio controller 103 can use end-to-end audio control parameters to formulate audio control parameters to emulate to an audio source device a direct connection from the audio source device to the audio output device (even though the audio content passes through audio controller 103).

Generally, wireless NIC 107 can receive audio content from an audio source device and send the audio content to an audio output device. Wireless NIC 107 can transfer portions of content in accordance with audio control parameters established between audio controller 103 and an audio source device and in accordance with audio control parameters established between audio controller 103 and an audio output device, such that the end-to-end transfer is in accordance with the computed end-to-end audio control characteristics.

As depicted, output device 102 includes wireless NIC 109 and sound element 111. Wireless NIC 109 can receive and decode portions of audio content in accordance with audio control parameters established between output device 102 and an audio source device. Wireless NIC can transfer received portions of audio content to sound element 111. Sound element 111 can emit sound (e.g., music, speech, etc.) from received portions of audio content.

Figure 2:
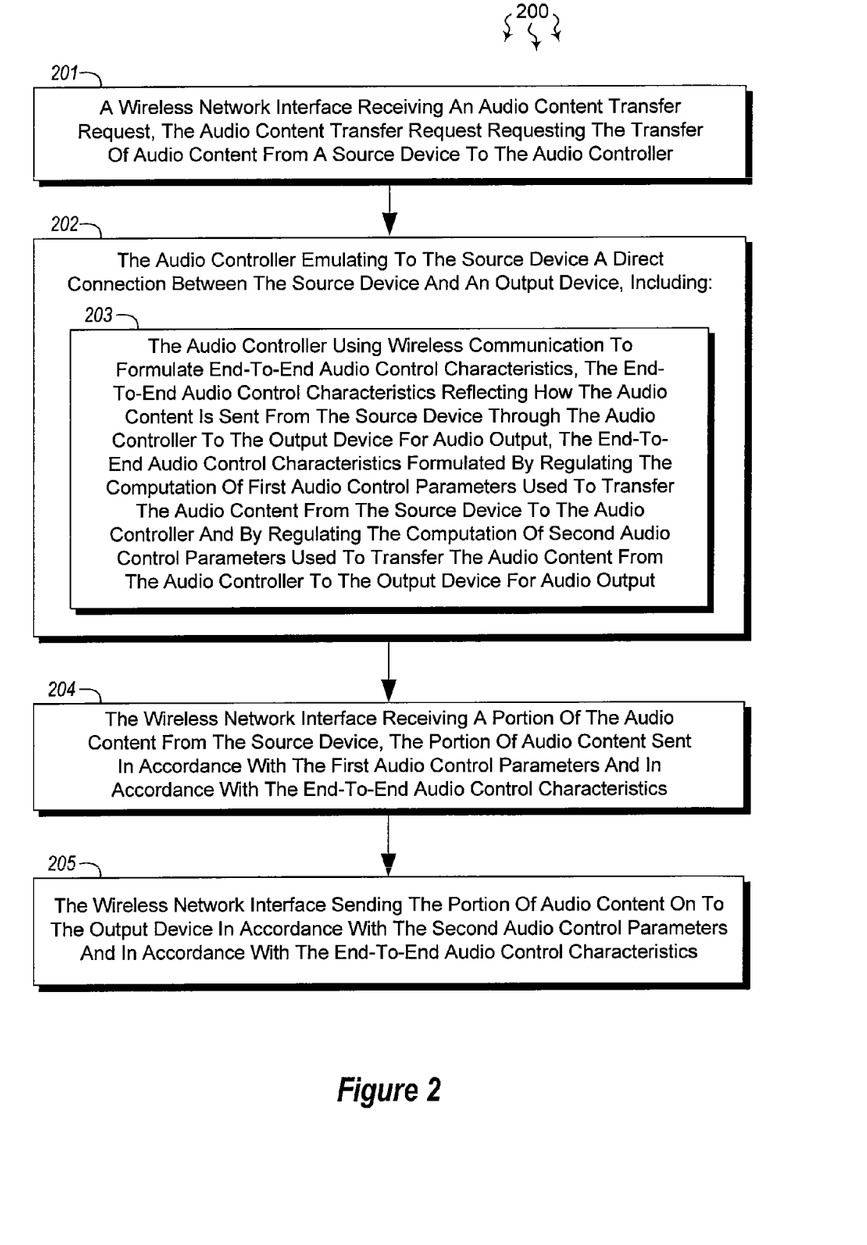
FIG. 2 illustrates a flow chart of an example method for wirelessly transferring audio content from a source device to an output device

FIG. 2 illustrates a flow chart of an example method 200 for wirelessly transferring audio content from a source device to an output device. Method 200 will be described with respect to the components and data of computer architecture 100.

Method 200 includes an act of the wireless network interface receiving an audio content transfer request, the audio content transfer request requesting the transfer of audio content from the source device to the audio controller (act 201). For example, wireless NIC 107 can receive transfer request 112. Transfer request 112 can request the transfer of audio content 104 to from source device 101 to audio controller 103.

Method 200 includes an act of the audio controller emulating to the source device a direct connection between the source device and the output device (act 202) For example, audio controller 103 can emulate a direct connection between source device 101 and output device 102 to source device 101.

Act 202 includes an act of the audio controller using wireless communication to formulate end-to-end audio control characteristics, the end-to-end audio control characteristics reflecting how the audio content is sent from the source device through the audio controller to the output device for audio output, the end-to-end audio control characteristics formulated by regulating the computation of first audio control parameters used to transfer the audio content from the source device to the audio controller and by regulating the computation of second audio control parameters used to transfer the audio content from the audio controller to the output device for audio output (act 203). For example, through current or prior wireless communication with source device 101, parameter computation module 108 can formulate end-to-end audio control characteristics 123. End-to-end audio control characteristics 123 reflect how audio content is sent from source device 101 through audio controller 103 to output device 102 for audio output, including end to end timing considerations, such as, combined playback delay from source device 101 to output device 102. In some embodiments, a combined playback delay is essentially equal to the round trip time between source device 101 and audio controller 103 plus a playback delay between audio control 103 and output device 102.

Parameter computation module 108 can formulate end-to-end audio control characteristics 123 by regulating the computation of audio control parameters 121 (e.g., playback delay from source device 101 to audio control 103) used to transfer audio content from source device 101 to audio controller 103. For example, audio controller 103 can represent to source device 101 that the playback delay between source device 101 and audio controller 103 is the combined playback delay. Parameter computation module 108 can also formulate end-to-end audio control characteristics 123 by regulating computation audio control parameters 122 (e.g., playback delay from audio control 103 to output device 102) used to transfer audio content from audio controller 103 to output device 102.

Among other things, combined audio control parameters 123 can define how to transfer audio content in order to account for timing differences associated with audio commands received at source device 101 and when the results of received audio commands are realized at output device 102. Audio commands include changing volume as well as transitions between pause, play, fast forward, rewind, etc. The results of an audio command are realized when sound emitted at sound element 111 conforms to the audio command. For example, the results of a pause command entered at source device 101 are realized when sound is no longer emitted from sound element 111.

Method 200 includes an act of the wireless network interface receiving a portion of the audio content from the source device, the portion of audio content sent in accordance with the first audio control parameters and in accordance with the end-to-end audio control characteristics (act 204). For example, wireless NIC 109 can receive content portion 104P. Content portion 104P can be a portion of audio content 104 sent (e.g., streamed or copied) from wireless NIC 106 to audio controller 103. Wireless NIC 106 can send content portion 104P in accordance with audio control parameters 121 and in accordance with end-to-end audio control parameters 123.

Method 200 includes an act of the wireless network interface sending the portion of audio content on to the output device in accordance with the second audio control parameters and in accordance with the end-to-end audio control characteristics (act 205). For example, wireless NIC 107 can send content portion 104P to output device 102 in accordance with audio control parameters 122 and in accordance with end-to-end audio control characteristics 123. Accordingly, audio controller 103 ensures that the entire transfer process is in accordance with the end-to-end audio control parameters, and that the first audio control parameters emulate these end-to-end parameters to the source device.

In some embodiments, audio controller 103 completely decodes content portion 104P as received from source device 101. Audio controller 103 then re-encodes content portion 104P for transfer to output device 102.

Audio control parameters can also be adjusted during audio content transfer for optimization, to adjust for changed network conditions, etc.

Figure 3:
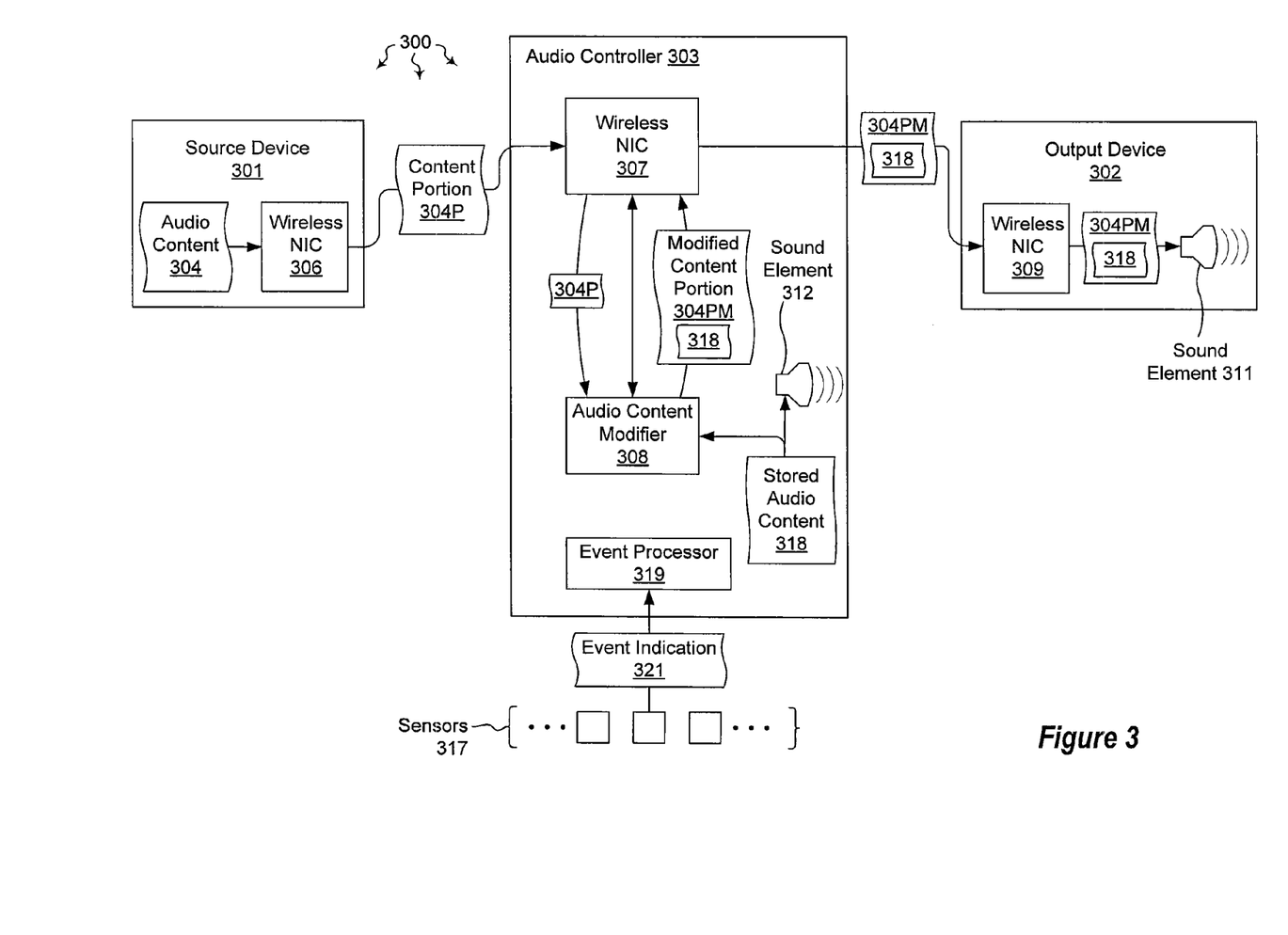
FIG. 3 illustrates an example computer architecture that facilitates modifying audio content being transferred through an audio controller.

FIG. 3 illustrates an example computer architecture 300 that facilitates modifying audio content being transferred through an audio controller. Referring to FIG. 3, computer architecture 300 includes source device 301 (e.g., an iPod), output device 302 (e.g., wireless speakers), and audio controller 303 (e.g., an alarm system or home automation control panel). Each of the components in computer architecture 300 can be connected to a network and use communication protocols as described with respect to computer architecture 100.

As depicted, source device 301 includes audio content 304 (e.g., digital data representing speech, music, etc.) and wireless NIC 306. Source device 301 can be any device similar those described with respect to source device 101. Audio content 304 can be stored at any location and can be stored in any format similar to those described with respect to audio content 104. Generally, in response to a command entered at source device 301 or in response to a command received from another computer system, wireless NIC 306 can be used to send audio content 304 (e.g., stream, download, copy, etc.) to an audio output device (e.g., speakers).

As depicted, audio controller 303 includes wireless NIC 307, audio content modifier 308, sound element 312, and event processor 319. Audio controller 303 can be a computer system and/or a controller for some other type of system, such as, for example, an alarm system or home automation system.

Generally, wireless NIC 307 can receive audio content from an audio source device and/or from modules within audio controller 303 and send the audio content to an audio output device.

Audio controller 303 is connected to sensors 317. Sensors 317 can include passive and active alarm system sensors (motion detectors, door sensors, glass break sensors, etc), home automation sensors (e.g., electric eyes, temperature sensors, wind sensors, etc), etc. Sensors 317 can be connected to audio controller 303 via wired and/or wireless connections. Event processor 319 is configured to receive event indications (e.g., indicating a door has been open, that the temperature is higher or lower than a pre-set temperature, etc.) from sensors 317. Event processor 319 can take responsive actions to an indicated event, such as, for example, sounding an alarm or status signal, turning on/off a light, etc. When responsive actions include emitting sound, event processor 319 can send locally stored audio content (e.g., digital data representing speech, alarm tones, status tones, etc.) to output device 302 and/or to sound element 312. Sound element 312 can emit sound (e.g., speech, alarm tones, status tones, etc.) from received portions of audio content.

When audio controller 303 is transferring audio content 304 to output device 302, event processor 319 can also cause locally stored audio content 318 to be sent to output device 302 as well. For example, during transfer of audio content 304 from a source to output device 302, audio controller can completely decode the audio content as received from the source device. The decoded audio content is temporarily stored in a buffer (e.g., in system memory) at audio controller 103. Audio controller 103 can then access the decoded audio content from buffer, re-encode the audio content, and send the audio content to output device 302.

In response to an indicated event, event processor 319 can instruct audio content modifier 308 to access decoded audio content from the buffer. Audio content modifier 308 can combine the buffered audio content with locally stored audio content 318. Combining buffered audio content with locally stored audio content can include: mixing locally stored audio into buffered audio content, pre-empting portions of buffered audio content with local stored audio content, modifying the volume of buffered audio content, overlaying locally stored audio into buffered audio content, etc. The combined audio content is re-encoded and sent to output device 302.

Accordingly, in response to an indicated event, locally stored audio content can be output both at sound element 312 and at sound element 311. In some embodiments, the volume of buffered audio content 304P is lowered so that locally stored audio content 318 is more prominently emitted at sound element 311.

As depicted, output device 302 includes wireless NIC 309 and sound element 311. Wireless NIC 309 can receive portions of audio content in accordance with audio control parameters established between output device 302 and an audio source device. Wireless NIC 309 can transfer (including decoding and re-encoding when appropriate) received portions of audio content to sound element 311. Sound element 311 can emit sound (e.g., music, speech, alarm tones, status tones, etc.) from received portions of audio content.

Figure 4:
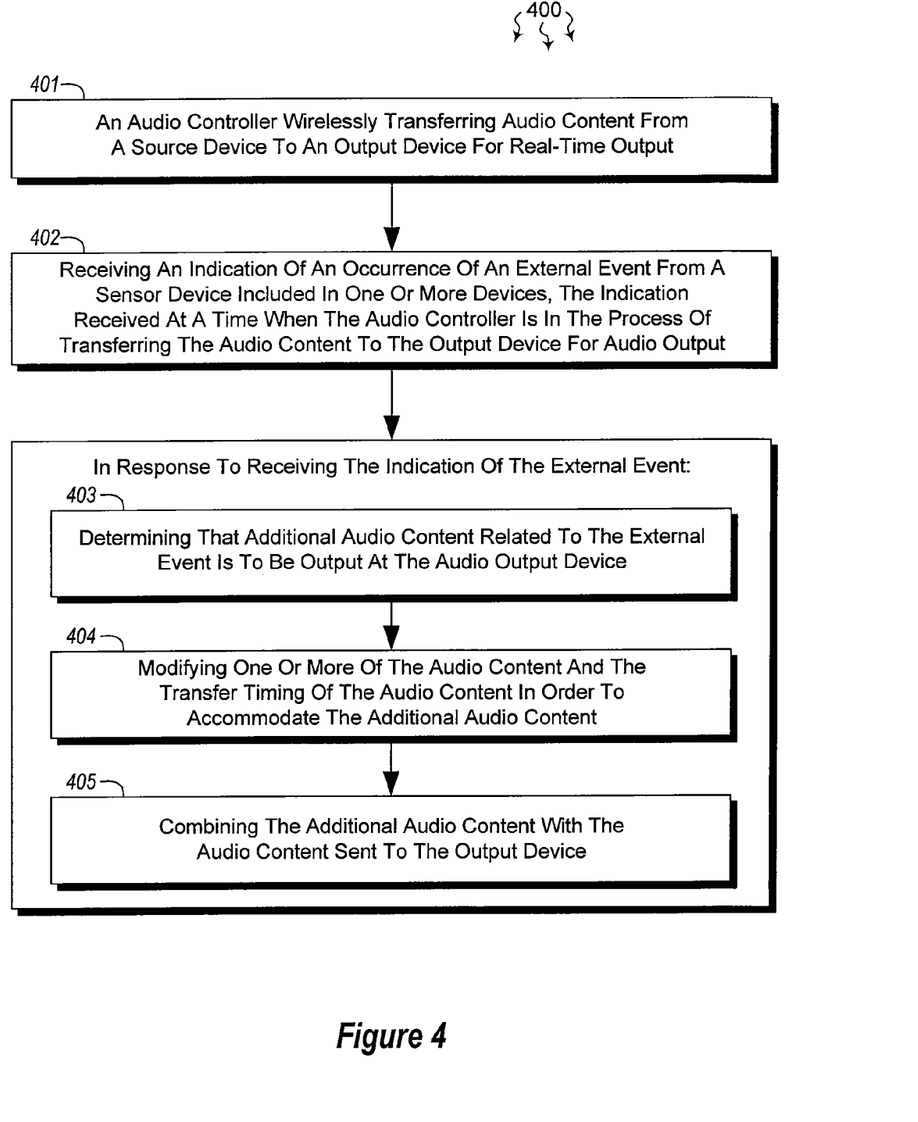
FIG. 4 illustrates a flow chart of an example method for modifying audio content being transferred through an audio controller.

FIG. 4 illustrates a flow chart of an example method 400 for modifying audio content being transferred through an audio controller. Method 400 will be described with respect to the components and data of computer architecture 300.

Method 400 includes an act of the audio controller wirelessly transferring the audio content from a source device to an output device for real-time output (act 401). For example, source device 310 can wirelessly transfer audio content 304 to audio controller 303. Audio controller 303 can wirelessly transfer audio content 304 onto output device 320.

Method 400 includes an act of receiving an indication of an occurrence of an external event from a sensor device included in the one or more devices, the indication received at a time when the audio controller is in the process of transferring the audio content to the output device for audio output (act 402). For example, event processor 319 can receive event indication 321 indicating detection of an external event by a sensor in sensors 317. The external event can be an alarm system event (e.g., door opening, motion within in area, etc.) or a home automation system event (e.g., a change in temperature). Event indication 321 can be received when content portion 304P (a portion of audio content 304) is being transferred to output device 302 for (e.g., essentially real-time) audio output. As such, content portion 304P may be stored in a buffer at audio controller 303 at the time event processor 319 receives event indication 321.

In response to receiving the indication of the external event, method 400 includes an act of determining that additional audio content related to the external event is to be output at the audio output device (act 403). For example, event processor 319 can determine that stored audio content 318 (digital data) is to be output to audibly represent detection of the external event to a user. Stored audio content can be matched to the type of event. For example, when event indication 321 indicates a garage door has been opened, stored audio content for emitting the phrase "garage door open" can be selected for output at output device 302 (and also for output at sound element 312).

In response to receiving the indication of the external event, method 400 includes an act of modifying one or more of the audio content and the transfer timing of the audio content in order to accommodate the additional audio content (act 404). For example, audio content modifier 308 can access content portion 304P (e.g., from system memory) and stored audio content 318. Audio content modifier 308 can modify content portion 304P and/or the transfer timing of content portion 304P to accommodate stored audio content 318.

In response to receiving the indication of the external event, method 400 includes an act of combining the additional audio content with the audio content sent to the output device (act 405). For example, audio content modifier 308 can combine the modified content portion 304P and stored audio content 318 into modified content portion 304PM, which includes (accommodates) stored audio content 318. Audio controller 103 can send modified content portion 304PM to output device 302.

Output device 302 can receive modified content portion 304PM and forward modified content portion 304PM to sound element 311. Sound element 311 can emit sound representative of modified content portion 304PM. For example, content portion 304P (e.g., part of a song) can be played at a lower volume so that stored audio content (e.g., "garage door open") is output more prominently. Stored audio content 318 can also be output at sound element 312 in combination with modified content portion 304PM being output at sound element 311. Accordingly, stored audio content responsive to an external event can be output at multiple locations in response to detecting the external event.

Figure 5:
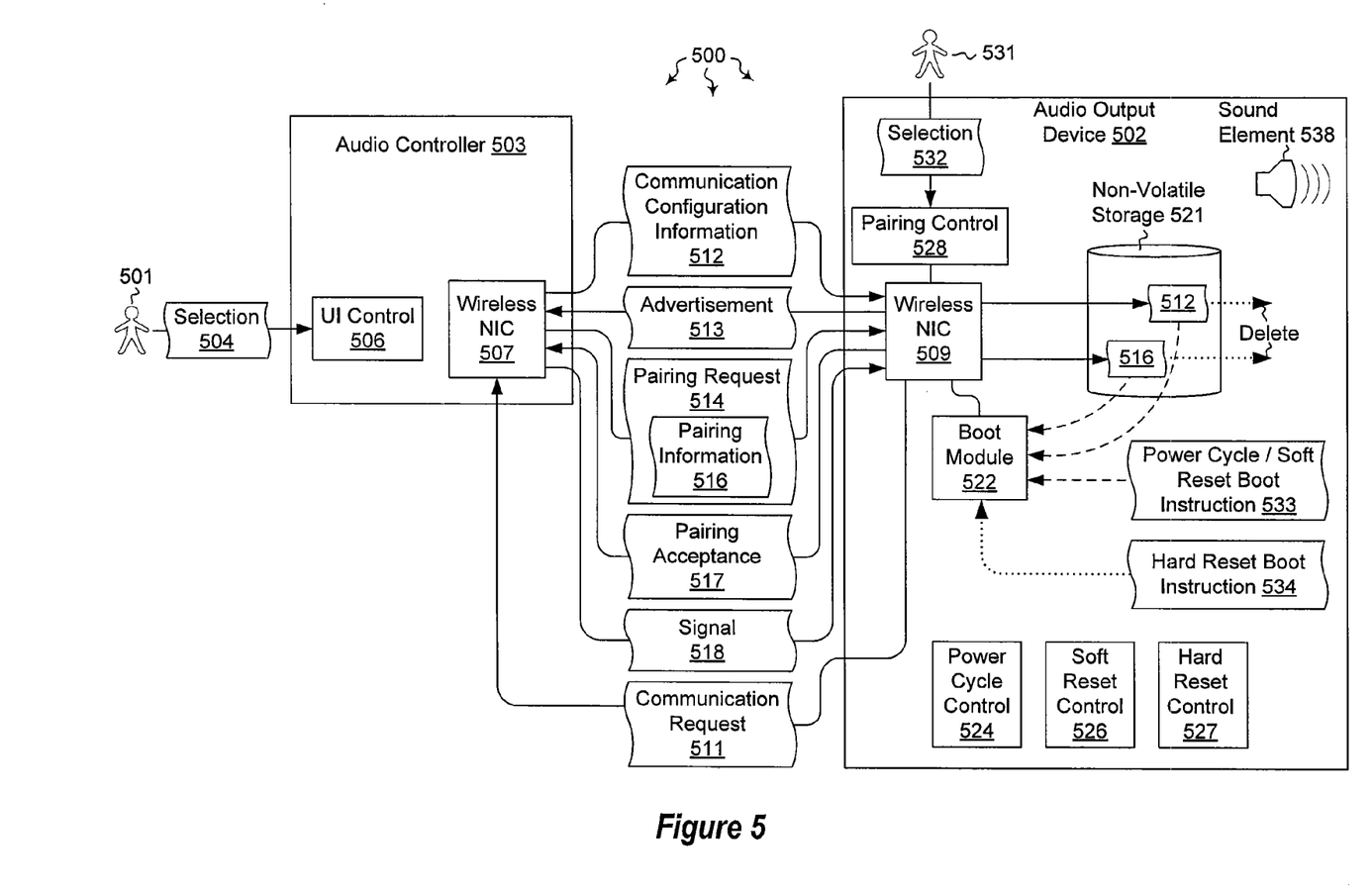
FIG. 5 illustrates an example computer architecture that facilitates connecting an audio controller with an audio output device.

FIG. 5 illustrates an example computer architecture 500 that facilitates connecting an audio controller with an audio output device. Referring to FIG. 5, computer architecture 300 includes audio controller 503 (e.g., an alarm system control panel or home automation system control panel) and output device 502 (e.g., wireless speakers). Each of the components in computer architecture 500 can be connected to a network and use communication protocols as described with respect to computer architecture 100.

As depicted, audio controller 503 includes UI control 506 and wireless NIC 507. UI control 506 can be used to pair audio controller 503 with audio output devices. For example, when selected, UI control 506 can transition audio controller 503 into a wireless pairing mode. In wireless pairing mode, audio controller 503 can accept communication requests from other wireless devices to establish wireless communication with audio controller 503. Audio controller 503 can send communication configuration information (e.g., including a Service Set ID ("SSID") and private shared key ("PSK") for encryption) for communicating with audio controller 503 in response to accepted communication requests. The other wireless devices can use the communication configuration information to communicate with audio controller 503.

As depicted, audio output device 502 includes wireless NIC 509, boot module 522, pairing control 528, and sound element 538. Generally, to boot audio output device 502, a user can select a specified device control. For example, user 531 can select any of power cycle control 524 (e.g., on/off switch or power cable), soft reset control 526 (e.g., a reset button activated in a first specified manner), and hard reset control 527 (e.g., the reset button activated in a second specified manner) to boot audio output device 502.

Upon booting, boot module 522 is configured to determine the boot event (power cycle event, soft reset event, or hard reset event) that caused audio output device 502 to boot up. Based on the boot type, boot module 522 can execute different sets of instructions to transition audio output device 502 into an operational state.

In some embodiments, boot module 522 executes essentially the same set of instructions in response to a power cycle event or soft reset event. When appropriate, instructions executed by boot module 522 can access data stored in non-volatile storage 521. The executed instructions can use the accessed data during the boot up procedure to perform various functions, such as, for example, automatically connecting to a wireless access point and pairing with an audio source device. When appropriate, instructions executed by boot module 522 can also delete data stored in non-volatile storage 521. For example, the executed instructions can delete data used to automatically connect to wireless access pointer and/or used to pair with an audio device.

Generally, wireless NIC 509 facilitates wireless communication with other devices. Wireless NIC 509 can be used to associate with a wireless access point. Through wireless NIC 509, audio output device 502 can broadcast a communication request to any wireless access points within range. A wireless access point can respond with appropriate communication configuration information. Audio output device 502 can use the communication configuration information to connect to the wireless access point. Audio output device 502 can also store the communication configuration information in non-volatile storage 521.

Subsequent to audio output device 502 establishing wireless communication with audio controller 503, audio output device 502 and audio controller 503 can engage in further communication. The further communication can include audio output device 502 advertising functionality.

Audio controller 503 can return a pairing request, including pairing information, to audio output device 502. Audio output device 502 can accept the pairing to audio controller 503. Audio output device 502 can also store pairing information in non-volatile storage 521. Upon receiving a final signal in the pairing process from audio controller 503, audio output device 502 can stop advertising the ability to output audio content. Alternately, after the paring process is complete, audio controller 503 can send a further signal to audio output device 502. In response to the further signal, audio output device 502 can stop advertising the ability to output audio content.

Accordingly, audio output device 502 is essentially "locked" to audio controller 503. Further, audio output device 502 can use the stored communication configuration information and pairing information to more efficiently re-connect and re-pair with audio controller.

Subsequent to a hard reset or upon other conditions when stored communication configuration information and pairing information are not available (e.g. a first power up), user 531 can enter selection 532 to select pairing control 528 (e.g., a hard or soft user-interface control). In response to the selection of pairing control 528, audio output device 502 can initiate the pairing process by sending a request for communication configuration information.

Figure 6:
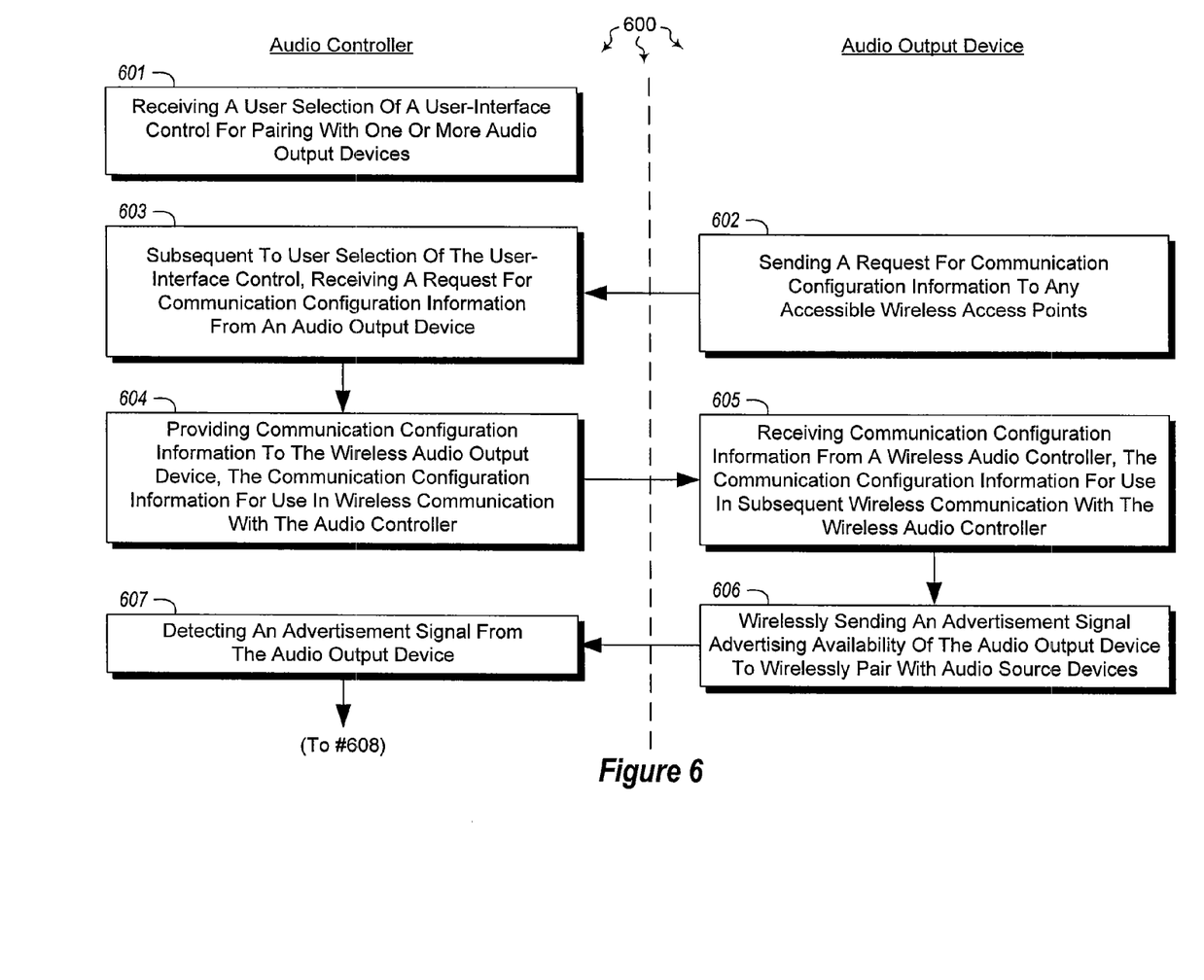
FIG. 6 illustrates a flow chart of an example method for connecting an audio controller with an audio output device.

FIG. 6 illustrates a flow chart of an example method 600 for connecting an audio controller with an audio output device. Method 600 will be described with respect to the components and data of computer architecture 500.

Method 600 includes an act of receiving a user selection of a user-interface control for pairing with one or more audio output devices (act 601). For example, audio controller 502 can receive selection 504 of UI control 506 from user 501. Selection of UI control 506 can transition audio controller 503 into base station mode and make audio controller 502 available to pair with audio output devices.

Method 600 includes an act of sending a request for communication configuration information to any accessible wireless access points (act 602). For example, audio output device 502 can broadcast communication request 511 to audio controller 503. Method 600 includes an act of, subsequent to user selection of the user-interface control, receiving a request for communication configuration information from an audio output device (act 603). For example, audio controller 503 can receive communication request 511 from audio output device 502.

Method 600 includes an act of providing communication configuration information to the wireless audio output device, the communication configuration information for use in wireless communication with the audio controller (act 604). Method 600 includes an act of receiving communication configuration information from a wireless audio controller, the communication configuration information for use in subsequent wireless communication with the wireless audio controller (act 605). For example, audio controller 503 can provide communication configuration information 512 to audio output device 502. Audio output device 502 can receive communication configuration information 512 from audio controller 503. Audio output device 502 can use communication configuration information 512 for wireless communication (e.g., to connect) with audio controller 503.

Method 600 includes an act of wirelessly sending an advertisement signal advertising availability of the audio output device to wirelessly pair with audio source devices (act 606). Method 600 includes an act of detecting an advertisement signal from the audio output device (act 607). For example, audio output device 502 can send advertisement 513 to audio controller 502. Advertisement 513 advertises the ability of audio output device to wirelessly pair with audio controller 503. Audio controller 503 can detect advertisement 513.

Method 600 includes an act of sending a pairing request to the detected audio output device, the pairing request including controller pairing information (act 608). Method 600 includes an act of accepting a pairing request from the wireless audio controller based on received controller pairing information (act 609). For example, audio controller 502 can send pairing request 514, including pairing information 516, to audio output device 502. Audio output device 502 can accept pairing request 514 from audio controller 502 based on pairing information 516. Audio output device 502 can send pairing acceptance 517 to audio control 503 to indicate acceptance of pairing request 514.

Method 600 includes an act of sending a signal to the audio output device to prompt the audio output device to stop sending advertisement signals such that other devices are unable to detect the audio output device and the audio output device is essentially locked to the audio controller (act 610). Method 600 includes an act of receiving a signal from the wireless audio controller, the signal prompting the audio output device to stop sending advertisement signals (act 611). For example, audio controller 503 can send signal 518 to audio output device 502. Audio output device 502 can receive signal 518 from audio controller 503. Signal 518 prompts audio output device 502 to stop sending advertisements signals. In response to receiving signal 518, audio output device can stop sending advertisements. Accordingly, other audio source devices are unable to detect audio output device 502.

Signal 518 can be a final signal sent from audio controller 503 to audio output device 502 during the pairing process between audio controller 503 and audio output device 502. Audio output device 502 can be configured to stop sending advertising signals in response to receiving this final signal. Alternately, signal 518 can be a further signal sent from audio controller 518 to audio output device 502 after the pairing process has completed. The further signal can expressly instruct audio output device 502 to stop sending advertising signals.

In response to receiving the signal, method 600 includes an act of locking the audio output device to the wireless audio controller (act 612). For example, in response to receiving signal 618, audio output device 502 is essentially locked to audio controller 503. Act 612 includes an act of storing the communication configuration information and controller pairing information in the non-volatile storage (act 613). For example, audio output device 502 can store communication configuration information 512 and pairing information 516 in non-volatile storage 521.

Act 612 includes an act of directing the audio output device to re-connect to the audio controller in response to a power cycle or soft reset of the audio output device (act 614). For example, in response to a power cycle or soft reset, boot module 522 can execute power cycle/soft reset boot instructions 533. Power cycle/soft reset boot instructions 533 can direct audio output device 502 to re-connect to audio controller 503.

Act 614 includes an act of automatically re-establishing wireless communication with the wireless audio controller using the stored communication configuration information (act 615). For example, during execution, power cycle/soft reset boot instructions 533 can access communication configuration information 512 and pairing information 516 from non-volatile storage 521. Boot module 522 and wireless NIC 509 can use communication configuration information 512 to reestablish wireless communication with audio controller 503.

Act 614 includes an act of re-advertising availability to wirelessly pair with audio source devices (act 616). For example, audio output device 502 can re-send advertisement 513 indicating availability to wirelessly pair with audio source devices. Act 614 includes an act of accepting a pairing request from the previously paired wireless audio controller based on the stored controller pairing information (act 617). For example, audio output device 502 can accept a pairing request from audio controller 503 based on pairing information 516. Upon receiving a new pairing request from audio controller 503, audio output device 502 can compare pairing information in the new pairing request to pairing information 516. Based on the comparison, audio output device 502 can derive that it was previously paired with audio controller 503. In response, audio output device 502 can again pair with audio controller 503.

Act 614 includes an act of rejecting or not responding to pairing requests from other devices based on the stored controller pairing information (act 618). For example, audio output device 502 rejects pairing requests from other devices based on pairing information 516. Upon receiving a pairing request from another device, audio output device 502 can compare pairing information in the pairing request to pairing information 516. Based on the comparison, audio output device 502 can derive that it was not previously paired with the other device. In response, audio output device 502 does not respond to the pairing request from the other device.

Act 612 includes an act of permitting the audio output device to connect to any wireless access point and audio source device in response to a hard reset of the audio output device (act 619). For example, in response to a hard reset, boot module 522 can execute hard reset boot instructions 534. Hard reset boot instructions 534 permit audio output device 502 to connect to any source audio device.

Act 619 includes an act of removing the communication configuration information and controller pairing information from non-volatile storage (act 620). For example, during execution, hard reset boot instructions 534 can delete configuration information 512 and pairing information 516 from non-volatile storage 521. Act 619 includes an act of sending a new request for communication configuration information to any accessible audio source devices (act 621). For example, in response to selection of pairing control 528, audio output device 502 can re-broadcast communication request 511. Re-broadcasting communication request 511 can result in a pairing with a new wireless access point and audio source device.

Accordingly, an audio output device can be restricted to connecting to a single device, which is both a wireless access point and an audio source device, such as, for example, an audio controller. After the audio output device receives communication configuration information from a wireless access point and sends a pairing advertisement signal, the audio output device accepts a pairing request from the same device from which it received communication configuration information. After a hard reset, the audio output device is once again permitted to connect to any single device that is both a wireless access point and an audio source device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for modifying audio content being transferred through an audio controller, comprising:
    sending, via the audio controller, a pairing request to an output device, the pairing request including audio controller pairing information;
    pairing the audio controller with the output device upon the output device accepting the pairing request, wherein the output device stores the controller pairing information upon accepting the pairing request;
    upon losing the pairing between the audio controller, using the stored controller pairing information to reestablish the pairing between the audio controller and the output device, wherein the output device does not respond to pairing requests from other devices based on the stored controller pairing information;
    wirelessly transferring, via the audio controller, the audio content from a source device to the output device for real-time output, the audio content comprising data in a digital audio format representing music;
    receiving an indication of an occurrence of an external event from a sensor device, the indication received at a time when the audio controller is in the process of wirelessly transferring the audio content to the output device for audio output; and
    in response to receiving the indication of the external event:
        determining that additional audio content related to the external event is to be output at the audio output device;
        modifying one or more of the audio content and the transfer timing of the audio content in order to accommodate the additional audio content; and
        combining the additional audio content with the audio content sent to the output device.

2. The method as recited in claim 1, wherein the wirelessly transferring the audio content from a source device to an output device for real-time output comprises an act of one of: an alarm system control panel and a home automation system control panel wirelessly transferring the audio content from a source device to an output device.

3. The method as recited in claim 1, wherein the wirelessly transferring the audio content from a source device to an output device for real-time output comprises:

wirelessly transferring music from an audio source device to wireless speakers.

4. The method as recited in claim 1, wherein the receiving an indication of an occurrence of an external event from a sensor device comprises:

receiving an alarm system event from an active or passive sensor included in an alarm system.

5. The method as recited in claim 1, wherein the determining that additional audio content related to the external event is to be output at the audio output device comprises:

determining that additional audio content related to an alarm system condition is to be output at the audio output device.

6. The method as recited in claim 1, wherein the modifying one or more of the audio content and the transfer timing of the audio content in order to accommodate the additional audio content comprises:

lowering the volume of the audio content.

7. The method as recited in claim 1, wherein the combining the additional audio content with the audio content sent to the output device comprises:

mixing the additional audio content into the audio content.

\* \* \* \* \*